United States Patent Office

3,459,736
Patented Aug. 5, 1969

3,459,736
ORGANIC ESTERS PREPARED WITH THE USE OF A TITANIUM PEROXIDE-CONTAINING CATALYST, SAID ESTER BEING SUITABLE FOR USE AS A PLASTICIZER FOR ORGANIC FILM-FORMING MATERIALS AND METHOD OF PREPARING SUCH ESTERS
Horst Dalibor, Harksheide, near Hamburg, Germany, assignor to Reichhold Chemicals, Inc., White Plains, N.Y.
No Drawing. Filed June 26, 1964, Ser. No. 378,427
Claims priority, application Germany, Sept. 3, 1963, R 36,028
Int. Cl. C07c 67/00; C08g 17/003
U.S. Cl. 260—234                                  7 Claims

ABSTRACT OF THE DISCLOSURE

This application discloses an improved organic ester formed by a process of esterification or re-esterification in the liquid phase in the presence of titanium peroxide catalysts. Such ester has been found to be particularly suitable for use as a plasticizer for organic film-forming materials such as cellulose derivatives, rubber, lacquers, resins, linseed oil and plastics.

---

The invention relates to the use of plasticizers of esters that are known by themselves but are obtained by a new method of producing esters that comprises a direct esterification of acids and alcohols or reesterification of acid esters with alcohols in the liquid phase and in the presence of titanium peroxide-containing catalysts.

The plasticizers are generally substances that combine with organic film-forming materials, either dissolved or undissolved therein, to form homogeneous products. Organic film-forming materials are for example cellulose derivatives (nitrocellulose, cellulose acetate), rubber, lacquers, resins, linseed oil and plastics. Satisfactory plasticizers are glyceroldiacetate, dibutyl- and diamylphthalate, benzylacetate, amylsalicylate, phthalic acid resins, dialkylesters of sebacic acid. The most important plasticizers having esters as a basis are described for example in the text-book "Die Kunststoffe" by Dr. Georg Schulz (1959) at page 280.

Plasticizers having acid esters as a basis have been generally obtained by esterification reactions of carboxylic acids and alcohols in the liquid phase which were catalyzed by the addition of a strong mineral acid, such as hydrochloric acid or sulfuric acid, or aryl sulfonic acids, as well as metal salts of strong mineral acids that easily hydrolyze in the presence of water, such as zinc and stannous chlorides. In the case of esterification reactions in the liquid phase, the catalyst most frequently employed was sulfuric acid because it usually was more effective in speeding up the ester formation and increasing the percentage conversion of organic acid to ester than other known esterification or reesterification catalysts.

However, the use of acid catalysis for the preparation of plasticizers in the case of esterification reactions carried out in the liquid phase with sulfuric acid and other strong acid catalysts, has definite drawbacks such as considerable dehydration of the alcohol component, as a result of which the cost of the process is increased due to the loss of alcohol and consequent reduction of ester yield. A further drawback is the fact that the resulting esters contain occluded acid and are therefore overly acid. This requires that the esters, before being used as plasticizers for plastics such as vinyl halide polymers or other halogen-containing polymers, be treated for the purpose of neutralizing the acid residue of the esters and thus avoid an accelerated degradation of the plasticized polymers which occurs in the presence of free acid. The expense that is necessary for protecting the installations used for the ester synthesis against the corrosive action of mineral acids or other strong acids is a further drawback of acid catalysts.

There are also known processes for the preparation of plasticizers by esterification of carboxylic acids with alcohols and for the reesterification of esters with alcohols in the liquid phase by the catalytic action of hydrated titanium oxides, and wherein the speed of the ester formation and the percent conversion of the acids to esters is the same or greater than that achieved with the aid of strong acid catalysts, which normally yields weakly acid esters that contain at least about 1 percent of occluded acid.

It has now been found that the use of plasticizers having as a basis carboxylic acid esters, which are known per se, offers considerable advantages when titanium compounds probably of the general formula $TiOR_4$, wherein R represents an OH group or a metal oxide radical, in finely divided form have been used for the esterification reactions of carboxylic acids and alcohols in the liquid phase, and that aside from the advantages resulting therefrom the drawbacks mentioned can be avoided. Suitable titanium compounds of the aforesaid general formula, in accordance with the present invention, are titanium peroxides.

The titanium peroxides are also referred to as peroxotitanic acid and peroxotitanates (see H. Remy, Lehrbuch der anorganischen Chemie, 9th edition, vol. II, 1959, pages 81 and 82.

The titanium peroxide-containing catalysts according to the present invention may be prepared by a known method or by a new method which is described hereinafter. For example, the treatment of titaniferous minerals such as rutile, ilmenite or bauxite sludge, with concentrated sulfuric acid, addition of an oxide, sulfate or carbonate of a bivalent metal to an acid solution, leads to the formation of titanium salts which, upon hydrolysis at normal temperatures or raised temperatures in the presence of peroxides and/or per compounds or other compounds that are capable of converting titanium compounds into titanium peroxide-containing products, yield hydrated or partially hydrated titanium peroxides.

Titanium peroxide gels, sometimes referred to as hydrated titanium peroxide, titanium peroxide hydroxide, peroxotitanic acid or pertitanic acid, can also be obtained by hydrolysis of titanium salts with ammonium or alkali hydroxide solutions in the presence of peroxides and/or peroxide salts or peracids and/or other oxidizing agents. Preferably, the salts formed during the preparation of the titanium peroxide gel are removed before the gel is added to the carboxylic acid and alcohol, or to the ester and alcohol. The preparation of the above-mentioned titanium peroxide gel by partial removal of water by extraction of the excess water with alcohol, drying in a vacuum, by heating or filtering under pressure, in order to evaporate part of the water, is one other method of obtaining titanium peroxides that are suitable as active catalysts in accordance with the present invention. Hydrated titanium peroxide obtained by other known methods, such as hydrolysis of titanium halides or by decomposition of titanium halides at raised temperatures by reaction with oxygen, air and water in the presence of per compounds or other suitable oxydizing agents, is also suitable as catalyst in accordance with the present invention.

A method for the preparation of hydrated titanium peroxide catalysts consists in reacting ammonium or alkali hydroxide solutions of titanium sulfate or titanium chloride in diluted acids in the presence of per compounds or suitable oxidizing agents, to form a hydrated titanium peroxide gel, removing the ammonium or alkali salts by filtration and washing the gel a few times with water to remove substantially all the impurities.

The preferred method of preparing titanium peroxide-containing catalysts in accordance with the present invention, consists in partially esterifying titanium halides with alcohols, wherein lower aliphatic alcohols are preferred, and thereupon treating the esterification product with per-compounds under hydrolyzing conditions. The preparation of alkoxytitanium halides from alcohols and titanium halides is described for example in German Patent 1,130,424. The product, upon being treated with per compounds, is suitably washed and then dried at slightly raised temperature in a vacuum. Another possibility of dehydrating the peroxide-containing titanium end product consists in a treatment with solvents, for example alcohols, or boiling solvents such as benzene, toluene, xylene and the like.

The per compounds that are suitable for the preparation of the catalysts in accordance with the present invention are for example: ozone, atomic oxygen, hydrogen peroxide and their salts, persulfates, percarbonates, perchlorates, periodates, organic peroxide compounds, such as benzoyl peroxide and others. Instead of or together with the per compounds, it is possible to use as oxidizing agents those wherein the potential, at the same pH value, is more positive than the potential of the titanium peroxide-containing compounds to be prepared. The concentration of the titanium peroxide catalysts to be used in accordance with the present invention may vary within a wide range. Preferred catalyst concentrations are from 0.01 to 1.0 percent by weight based upon the weight of the esterifiable carboxylic acids. However, it is possible to use, if necessary, concentrations of 2.0 or 5.0 and even 10.0% or more.

Esterification and re-esterification reactions for the preparation of plasticizers, in which the aforesaid titanium peroxide-containing catalyst is used, are those in which the esters are formed from carboxylic acids or carboxylic acid anhydrides and alcohols or, in the case of re-esterification reactions, where in an ester is reacted with an alcohol the boiling point of which is higher than that of the alcohol portion of the ester. The invention is therefore directed to the use of plasticizers having as a base carboxylic acid esters that are obtained by catalytic reactions of organic compounds containing at least one acyloxy group with a compound that contains at least one alcoholic hydroxyl group, in the liquid phase, at raised temperature and in the presence of a titanium peroxide-containing catalyst, wherein the compounds having at least one acyloxy group may be carboxylic acids, carboxylic acid anhydrides and esters of carboxylic acids. The following reactions are catalyzed by titanium peroxides:

(1) The reaction of a carboxylic acid with an alcohol with formation of an ester according to the general formula:

$$RCOOH + R'OH \rightarrow RCOOR' + H_2O$$

(2) The reaction of carboxylic acid anhydrides with alcohols according to the general formula:

$$(RCO)_2O + 2R'OH \rightarrow 2RCOOR' + H_2O$$

(3) The alcoholysis or reesterifications between carboxylic acid esters and other alcohols according to the general formula:

$$RCOOR_1 + R'OH \rightarrow RCOOR' + R_1OH$$

(4a) The reaction of carboxylic acids and hydroxyl groups-containing carboxylic acids.

(b) The reaction of a carboxyl groups-containing carboxylic acid ester with an alcohol.

(c) The reaction of a hydroxyl groups-containing carboxylic acid ester with a carboxylic acid according to the general formulae:

$$R_1COOH + ROHCOOH \rightarrow R_1COORCOOH + H_2O$$

$$R_1COORCOOH + R'OH \rightarrow R_1COORCOOR + H_2O$$

$$ROHCOOR_1 + R_2COOH \rightarrow RCOR_2COOR_1 + H_2O$$

In the reaction mentioned at 3, the alcohol of the formula R'OH should have a higher boiling point than the alcohol to be displaced, or the alcohol to be displaced should form an azeotropic mixture that boils below the boiling point of the alcohol that is introduced. In all of the above formulae the symbols $R_1$ and $R^1$ and $R_1$, $R_2$ represent aliphatic, cycloaliphatic or aromatic groups.

The esterifiable carboxylic acids are saturated aliphatic carboxylic acids, halogen- or hydroxy carboxylic acids, unsaturated aliphatic carboxylic acids and halogen carboxylic acids, saturated or unsaturated cycloaliphatic carboxylic acids and aromatic carboxylic acids, amino-, halogen, and hydroxy-carboxylic acids as well as the anhydrides of dibasic acids, such as succinic acid, glutaric acid, adipic acid, pimelic acid, maleic acid, mesaconic acid. citraconic acid, glutaconic acid, itaconic acid, hexahydrophthalic acid anhydride and phthalic acid anhydride.

The alcohols that may be reacted with carboxylic acids, carboxylic acid anhydrides and carboxylic acid esters belong to the alcohols having the general formula $R(OH)_n$, wherein R is an organic radical and $n$ is whole number, as well as hydroxycarboxylic acids and/or hydroxycarboxylic acid esters, such as methanol, chloroethanol, cyanoethanol, ethoxyethanol, phenylethanol, cyclohexanedimethanol, 2-chloro-1-propanol, 1-chloro-1-propanol, 3-bromo-1-propanol, 2,2-dichloro-1-propanol; ethyl, n-propyl, isopropyl, n-butyl and secondary butyl alcohol, 2-nitro-1-propanol, 1-chloro-2-propanol, 2-nitro-1-butanol, 2-methyl-1-pentanol, 2-methylpentanol-3, primary and secondary octanol, n-dodecanol, 6-dodecanol, lauryl, myristyl and stearyl alcohol, 2-propene-1-ol; 1-butene-1-ol, 3-pentene-1-ol and similar alcohols, as well as the multivalent saturated and unsaturated alcohols, such as ethylene glycol, 1,2-propylene glycol, 1,3-butylene glycol, glycerin, trimethylol propane, pentaerythrite, sorbitol, sugar, cyclohexanedimethanol and the like and aryl-substituted aliphatic alcohols.

As hydroxycarboxylic acids or their esters with alcoholic hydroxyl components it is possible to use: ricinoleic acid, ricinoleic mono-, di- and triglyceride, ricinoleic acid, ricinoleic mono-, di- and triglycerides, ricinoleic methyl ester, hydroxycitric acid ester, tartaric acid ester, lactic acid ester and saccharic acid ester.

Among the esters that can be reesterified with alcohols in the presence of titanium peroxides to form esters with alcohol components other than those derived from the previously formed ester, the following groups of compounds are mentioned by way of examples: esters obtained from saturated or unsaturated monocarboxylic acids and monovalent saturated or unsaturated alcohols as well as esters obtained from saturated or unsaturated monocarboxylic acids and polyvalent saturated or unsaturated alcohols, or also esters obtained from saturated or unsaturated polycarboxylic acids and monovalent alcohols. The use of the aforesaid catalysts for the polyester preparation has particular advantages.

The reaction conditions, such as temperature, pressure and quantities of reaction components, may vary within a wide range; for the most part, this will depend upon the nature of each of the reaction components and the end product to be obtained. However, in all cases the reaction components must be maintained in a liquid condition. Since the reactions proceed slowly at room temperature, it is preferred to work at raised temperatures particularly at reflux temperature. In order to insure the completeness of the reaction, it is possible to continuously or intermittently remove, in a known manner, one or more reaction products. The reaction may also be carried out in the presence of diluents with formation of azeotropic mixtures that boil at a lower temperature than that of the desired end product, which involves the removal of an undesirable byproduct or the removal of the desired end product, by passing superheated steam or inert gases, such as nitrogen, through the reaction mixture, or by carrying out the reactions under reduced or raised pressure, whereby in the latter case it is necessary to aerate from time to time to allow the undesired byproducts to escape.

A catalyst that is very useful in accordance with the present invention, can be obtained for example by preparing, in a first step, a mixture of partial titanic acid esters from titanium tetrachloride and methanol, in which dimethoxydichloro- and trimethoxymonochloro titanates are present. This mixture is hydrolyzed, in a second step, in a methanolic aqueous ammonia solution and subjected to a treatment with hydrogen peroxide. The catalyst obtained upon washing is added in small quantities to the carboxylic acid-alcohol mixture which is heated to the usual reaction temperatures of, for example, from 140 to 250° C. It was found that after short reaction periods, monomeric esters having an acid number of about 0.1 were obtained which possessed a light color and, after removal of the catalyst, exhibited very satisfactory electrical resistance values and which, without further purification treatments, can be applied as high-grade plasticizers in the electric cable and insulating material industries.

It is preferred, when using the aforesaid esterification catalysts, to also use the selected alcohol in excess quantities. For example, in the esterification of dicarboxylic acids or their anhydrides, such as phthalic acid anhydride, adipic acid, sebacic acid and the like, with monovalent alcohols, it is possible to choose a mol ratio of 1:2.5 to 1:3. It is a further advantage of the process according to the present invention that, as result of using the catalysts described, the alcohols that may undergo very slight changes, if any, can be esterified upon being recovered by distillation without any preliminary purification, and that after being put through ten to fifteen times it was not possible to ascertain any impairment from the standpoint of quality when this was compared to the exclusive use of fresh alcohol. If necessary, the quantity of active charcoal used for the absorptive purification of the plasticizers, is raised for example to two percent of active charcoal. By this treatment it is possible to obtain plasticizers of high quality. Straight-chained as well as branch-chained alcohols are equally well suited for use in the esterification process of the present invention.

The main quantity of the catalyst can be separated in a suitable manner after most of the excess alcohol has been distilled from the reaction mixture. It was surprising to find that the catalytic action of the titanium peroxide catalyst removed by filtration had practically no limits. Even after fifty consecutive applications of the catalyst in accordance with the present invention, no diminution of its action could be determined and the quality of the plasticizers produced remained unchanged. This behavior is a proof of the mild esterification conditions to which are subjected the carboxylic acid-alcohol mixtures in the presence of the catalyst. A small residue of about 10% of the catalyst is removed from the plasticizer which is completely free of alcohol by the addition of a small quantity of active charcoal followed by filtration.

A further advantage of the esterification process of the present invention is the fact that the neutralization and the washing operation can be dispensed with, these being unnecessary in view of the very small acid content of the reaction mixture. This has the effect of greatly shortening the manufacturing procedure. Another advantage is the fact that the saponification of the ester plasticizer is avoided which is generally accompanied by impairment of the electrical resistance values. Another advantage is the excellent yield of mono-, di-, tri- or polycarboxylic acid esters which is very close to the theoretical values.

Tests have shown that the carboxylic acid esters prepared by the process of German Patent 1,103,335, that are supposed to be suitable as plasticizers, have the drawback of still containing titanium dioxide gels which in spite of a treatment with active charcoal precipitate only after several weeks causing a very undesirable turbidity of the plasticizer. Moreover, the esters prepared according to this known process, if no neutralization and washing takes place, have a high acid content and connot be added to plastics that require a treatment on a hot calender. The drawbacks just mentioned are avoided by the present invention.

The following examples illustrate the process for the preparation of esters in the presence of titanium peroxide-containing catalysts as well as the effectiveness of the titanium peroxide-containing catalysts of the present invention. All parts, if not otherwise stated, are parts by weight.

EXAMPLE 1

148 parts by weight (1 mol) of phthalic acid anhydride, 390 parts by weight (3 mol) of 2-ethylhexanol and 0.85 part by weight titanium peroxide catalyst, which is prepared in the manner described above, are heated up to 215° C. The esterification water is continuously removed and the distilled off alcohol is recycled. After about 3 hours, the reaction mixture attains an acid number of 0.12. The excess alcohol is thereupon distilled off under a gradually increased vacuum. At the same time, the temperature is allowed to fall to 180° C. The crude ester recovered still contains 4 to 5% alcohol. The main quantity of catalyst is now filtered off and the plasticizer concentrated by thin-layer evaporation to an alcohol content of about 0.1%. There are obtained 390 parts by weight of di-(2-ethylhexyl)-phthalate which, after a treatment with 0.5% active charcoal, are subjected to filtration. Additional data is set forth in the table under No. 4. From the above-mentioned starting materials it is possible to recover 150 parts by weight of 2-ethylhexanol after addition of 260 parts by weight of fresh 2-ethylhexanol with 148 parts by weight of phthalic acid anhydride. If this is esterified in the manner indicated, and after-treated by the methods described, there is obtained with a good yield a plasticizer that is fully equivalent from the standpoint of quality. Even after the 2-ethylhexanol recovered by distillation is recycled nine times and after replenishing it with the required quantity of fresh alcohol, it was not possible to determine a deterioration of the quality of the di-(ethylhexyl)-phthalate.

The catalyst according to the present invention was prepared as follows:

600 parts by weight of methanol are poured into a three-necked flask provided with a stirrer and reflux cooler, and 600 parts of titanium tetrachloride are thereupon added while stirring and cooling for one hour, whereby a portion of the hydrochloric acid is displaced.

There is formed an oily mixture of partial titanic acid ester consisting of dimethoxydichloro- and trimethoxy-monochloro-titanium and which contains some free hydrochloric acid. In a second step, this solution is added dropwise, for two hours, to a three-necked flask provided with a stirrer and reflux cooler and containing a mixture of: 400 parts by weight of methanol, 1,000 parts by weight of 25% ammonia and 160 parts by weight of 30% hydrogen peroxide. By applying outside cooling it is possible to maintain the reaction temperature to 30–40° C. (40° C. must not be exceeded). To effect complete oxidation of the titanium compounds, it is recommended to add additional 80 gr. of 30% hydrogen peroxide. There is obtained an orange-red aqueous suspension of peroxytitanic acids that is subjected to centrifuging to remove the ions dissolved in water and is then washed with water until the water separated by the centrifugal action is substantially free of foreign ions. After this, more extensive centrifuging removes more water until the yellow catalyst has a powdery quality. The yield is 680 parts by weight of yellow peroxytitanic acids that still contain about 40% water. The catalyst obtained in this manner is ready for use.

EXAMPLE 2

146 parts by weight (1 mol) of adipic acid, 325 parts by weight (2.5 mol) of n-octanol and 0.42 part by weight of the above described peroxytitanic acid catalyst are heated as described in Example 1. After a reaction period of 1½ hours, the acid number was 0.1. Upon treating the ester in the manner indicated in Example 1, it is possible to obtain in a substantially theoretical yield 368 parts by weight of di-(n-octyl)-adipate. There are also obtained 65 parts by weight of n-octanol recycle distillate which, after being replenished with 260 parts by weight of fresh n-octanol, is used for esterification with 146 parts by weight of adipic acid, in the presence of the titanium peroxide catalyst, without causing any impairment of the quality of the di-(n-octyl)-adipate. Even after the recovered octanol recycle distillate has been put through nine times, it was not possible to observe the slightest impairment of the plasticizer.

EXAMPLE 3

830 parts by weight (5 mol) isophthalic acid, 1950 parts by weight (15 mol) 2-ethylhexanol, 85 parts by weight xylene and 13.4 parts by weight of the above described catalyst are esterified, in the manner described in Example 1, to an acid number of 0.15. The reaction period lasted 6½ hours. After elaborating and treating with 0.7% active charcoal there are obtained 1950 parts by weight of di-(2-ethylhexyl)-isophthalate. The 730 parts by weight of recovered recycle distillate, that contains aside from xylene also the excess 2-ethylhexyl alcohol, are mixed the amount of fresh alcohol and used for a further charge.

EXAMPLE 4

192 parts by weight (1 mol) trimellitic acid anhydride, 520 parts by weight (4 mol) 2-ethylhexanol and 1.5 parts by weight of the above-described catalyst are esterified in the manner set forth in Example 1. After the treatment of the ester, there are obtained 540 parts by weight of tri-(2-ethylhexyl)-trimellitate. In the course of the treatment it is possible to recover 130 parts by weight of 2-ethylhexanol recycle distillate, which can be returned to the process with a new charge without impairing the quality of the resulting triester.

EXAMPLE 5

560 parts by weight (2 mol) tall oil fatty acid, 474 parts by weight (3 mol) n-deconal, 30 parts by weight xylene and 1 part by weight of the above-mentioned catalyst are heated as in Example 1. After an esterification period of 6 hours there is obtained an acid number of 0.13. The decyl ester of tall oil fatty acid recovered after the final treatment in almost a theoretical yield, is then converted to an epoxide group-containing plasticizer by epoxydation carried out in known manner with hydrogen peroxide in the presence of formic acid. The xylene-containing n-decanol recycle distillate can be used without impairment of the quality for further esterifications.

The following table sets forth the comparative data that shows the superiority of di-(ethylhexyl)-phthalate (DOP), used as example, when this is prepared by the esterification process of the present invention using peroxytitanic acids as catalysts rather than the previously known catalysts. From this table it is quite apparent that the yields obtained by the use of peroxytitanic acids as catalysts are considerably higher than those of the known processes, and that the recovery of the alcohol-recycle distillate, even after it is put through several times, does not cause a reduction of the yield. The known esterification processes, which were carried out in the presence of acid catalysts, required the selection of mild conditions, i.e., temperatures not exceeding 150° C., although according to experience, even at temperatures up to 150° C., the alcohol is deleteriously affected by the formation of decomposition products. Temperatures in excess of 180° C. would, to be sure, greatly shorten the reaction periods but the result would be an increase of the oxidation and dehydration products that are contained in both the plasticizer and alcohol-recycle distillate. For the esterification in the presence of amphoteric catalysts, there have been selected temperatures as high as 210° C. to obtain esterification periods that are still useful. Thus, it was found that in the known processes the recovered alcohol, even after a single esterification, contained about 10–20% impurities. By contrast, if the process of the present invention is carried out in the above-described manner, the by-products in the alcohol-recycle distillate, even after the latter is put through nine times, only amount to about 2%. Even if such a recovered alcohol is esterified with phthalic acid anhydride, without being replenished with fresh alcohol, it is possible to obtain by the use of the titanium peroxide catalyst with a 97% yield, a di-(2-ethylhexyl)-phthalate the quality of which, after the absorptive treatment with 2% active charcoal, corresponds to that of a phthalic acid plasticizer obtained with fresh 2-ethylhexanol in accordance with the process of the present invention.

The loss of alcohol, as well as of ester, was found to be very small in the new process and well within the permissible limits. Traces of the catalysts that were not completely removed by filtration are quantitatively removed during the treatment with charcoal. As a result of this, in carrying out the heat tests with the plasticizers prepared in accordance with the present invention, only very insignificant changes were observed in contrast to those of analogous products obtained by previously known processes. In the latter, even after a treatment with much larger quantities of active charcoal, the resulting values were much less favorable (see table) due to impurities that were present, probably formed by the reaction of the catalysts with the alcohols, or due to changes of the plasticizer coming forth during the heat test.

EXAMPLE 6

In a flask provided with a thermometer, a stirrer and a reflux cooler, a mixture consisting of 395 parts by weight of 1.2-propylene glycol, 660 parts by weight of adipic acid, 1.6 parts by weight of a titanium peroxide catalyst according to Example 1 are esterified with separation of water up to 180° C., whereby the distilled off aqueous vapors must not essentially exceed 100° C. After the addition of 90 parts by weight of xylene the esterification is carried out at 180–220° C. with separation of water and refluxing of xylene until the acid number of 0.5 is obtained. The xylene is thereupon removed in a vacuum at raised temperature, i.e. up to a maximum of 230° C., and the saturated polyester is filtered after a treatment with active charcoal for the removal of catalyst. The reaction product is substantially water-clear notwithstanding its low acid number. The reaction product is particularly suitable for combining with isocyanates.

EXAMPLE 7

A mixture of 395 parts by weight of 1.2-propylene glycol, 585 parts by weight of adipic acid, 50 parts by weight of maleic acid anhydride, 1.6 parts by weight of titanium peroxide catalyst according to Example 1 and 90 parts by weight of xylene are esterified in accordance with Example 6 and after obtaining an acid number of 0.5 followed by the removal of the xylene, the unsaturated polyester is treated with active charcoal and filtered.

EXAMPLE 8

0.6 part by weight of titanium peroxide catalyst according to Example 1 and 672 parts by weight of soja oil are heated at 255° C. in a flask provided with a thermometer, a stirrer and a reflux cooler. At this point are added 110 parts by weight of pentaerythrite whereupon the whole is reesterified for 2 hours at this temperature until a sample can be diluted to the extent of 10% with ethanol. After cooling to 180° C. and addition of 14.5 parts by weight of maleic acid anhydride and 163 parts by weight of phthalic acid anhydride the esterification is carried out at 180–230° C. by recycling up to 97% in xylene and refluxing the xylene to an acid number of 1. The product is dissolved to the extent of 80% in mineral spirits and treated for the removal of the catalyst with active charcoal and filtered. The reaction product possesses faster drying properties than a reaction product prepared without the titanium peroxide catalyst. Moreover, the reaction product is suitable for the preparation of copolymers with styrene, vinyl toluene and other $\alpha,\beta$-unsaturated compounds. After repeated use the titanium peroxide catalyst becomes yellowish-brown, without however losing its effectiveness.

The measurement of the specific resistance is effected in accordance with SEV (Schweiz.Elektrotechn. Verein) Publication No. 184 on protective tubular covers for movable conductors.

The test pieces of 25 meters length are wound into windings of 12–15 cm. in diameter. The samples prepared in this manner are freely suspended in a water bath (tap water). The length of each of the conductor ends extending outside of the water is 25 cm., so that a conductor length of exactly 2 meters is wetted. After standing in the water for 24 hours, the measurement of the insulating resistance at 1000 volt between the conductor core and the water is effected.

The measurement in connection with the tubular protective covers is effected between a smooth copper wire pulled through a tube filled with water and the water bath.

The water temperature is increased within about 6 hours from 20° C. to 50° C. Before the measurement the tem-

COMPARATIVE ESTERIFICATION OF PHTHALIC ACID ANHYDRIDE WITH 2-ETHYLHEXANOL

| Catalyst | Phthalic acid anhydride, mol | 2-ethyl hexanol, mol | Esterification period | Esterification temperature, ° | Washing process | Treatment with active charcoal, percent |
|---|---|---|---|---|---|---|
| $H_2SO_4$ | 1 | 2.2, 99% pure, used first time | 5 hours to acid number 4 | 150 | 1x 5% NaOH, 3x by means of water. | 1.5 |
| $Al_2(SO_4)_3$ plus $H_3PO_4$ | 1 | do | 6 hours to acid number 4 | 150 | 1x with 5% NaOH, 3x by means of water. | 1.5 |
| $Al_2(SO_4)_3$ plus NaOH | 1 | 2.5, 99% pure, used first time | 7 hours to acid number 2.5 | 210 | 1x with 1% NaOH, 3x by means of water. | 1.0 |
| Titanium peroxide catalyst. | 1 | 3.0, 99% pure, used first time | 2–3 hours to acid number 0.12 | 210 | No washing process | 0.5 |
| Titanium peroxide catalyst. | 1 | 3.0, ⅓ used nine times, ⅔ used first time. | do | 210 | do | 1.0 |
| $H_2SO_4$ | 1 | 2.2, 10% used twice, 90% used first time. | 5 hours to acid number 4 | 150 | 1x with 5% NaOh, 3x by means of water. | 5.0 |
| $Al_2(SO_4)_3$ plus $H_3PO_4$ | 1 | do | 6 hours to acid number 4 | 150 | do | 5.0 |
| $TiO_2$-Gel according to Patent 1,103,335-Example 2. | 1 | 3.0, 99% used first time | 2 hours to acid number 2.8 | 210 | do | 0.5 |
| $TiO_2$-Gel according to Patent 1,103,335-Example 2. | 1 | do | do | 210 | No washing process | 0.5 |

ACCORDING TO KNOWN AND INVENTIVE PROCESS

| | Yield finished product, percent | Specific resistance, 20° C. ohm, cm. | Hazen-color number Mg Pt/ 1,000 ml. | After heat test 2.5 hours 220° C. | | Acid number |
|---|---|---|---|---|---|---|
| | | | | Specific resistance, 20° C. ohm, cm. | Hazen-color number Mg Pt/1,000 ml. | |
| Acid number: | | | | | | |
| 0.12 | 92 | $2.5 \times 10^{10}$ | 20 | $3.0 \times 10^9$ | 2.5 Iodine color number (yellow) | 1.17 |
| 0.10 | 92 | $2.9 \times 10^{10}$ | 20 | $2.0 \times 10^9$ | 2.0 Iodine color number (yellow) | 1.01 |
| 0.10 | 94 | $4.5 \times 10^{10}$ | 20 | $5.0 \times 10^9$ | 80 [1] | 0.5 |
| 0.05 | 99 | $2.0 \times 10^{11}$ | 10 | $1.0 \times 10^{11}$ | 15 | 0.1 |
| 0.06 | 98 | $3.85 \times 10^{11}$ | 20 | $1.95 \times 10^{11}$ | 20 | 0.12 |
| 0.15 | 85 | $2.0 \times 10^9$ | [1] 80 | $1.0 \times 10^8$ | 4–5 Iodine color number | 2.5 |
| 0.15 | 85 | $1.0 \times 10^9$ | [1] 70 | $0.8 \times 10^8$ | do | 2.2 |
| 0.1 | 94 | $5.5 \times 10^{10}$ | 25 | $7 \times 10^9$ | 80 [1] | 0.8 |
| 2.5 | 96 | $4 \times 10^9$ | 40 | $3 \times 10^8$ | 2–3 Iodine color number | 4.5 |

[1] Yellowish.

Results of tests carried out with di-(2-ethylhexyl)-phthalate prepared in accordance with the present invention for use as plasticizer in PVC The following two mixtures were prepared for the purpose of measuring the electrical properties:

| | Mixture 1 | Mixture 2 |
|---|---|---|
| PVC suspension of electrical quality | 65 | 59.8 |
| Di-(2-ethylhexyl)-phthalate | 35 | 32.2 |
| Burgess clay | | 8.0 |
| Dibasic lead stearate | 0.65 | 0.6 |
| Plumb-o-Sil of electrical quality | 1.3 | 1.2 |

500 gr. of the above mixture is mixed with a spatula in a porcelain dish and transferred to a set of laboratory mixing rollers. A homogenizing effect is obtained by operating at a roller temperature of 170° C. and frequently cutting. The sheeted mass is pulled off after 15 minutes. After a cooling period it is cut up in a rotary cutter to the size of granules (5 mm.). The granular product is then injection molded by means of a Kleinewefers extruder, into a tubular shape. Temperature in the compression cylinder 175° C., at the extrusion plate 165° C., revolution of screw 40/min.

perature is kept constant for about 30 minutes at 0.1° C. with the aid of a contact thermometer and vigorous stirring. After the measurement the water temperature is raised within about 4 hours from 50° C. to 70° C.

From the dimensions of the conductor insulation and insulation resistances measured at the temperatures of 20° C., 50° C. and 70° C. It is possible to calculate the specific resistance of the mass in M cm. in accordance with the following equation:

$$\rho = \frac{R \pi l}{1_n\left(\frac{r_a}{r_i}\right)}$$

wherein:
$\rho$ represents the specific resistance in M$\Omega$ cm.
R represents the measured insulation resistance in M$\Omega$,
1 represents the measured length in cm.,
$r_a$ represents the outside radius of the insulation cover in cm., $r_1$ represents the inside radius of the insulation cover in cm., and
$l_n$ represents the natural logarithm.

Thus, it was possible to measure the following electrical resistances:

|  | Spec. resistance in $10^3$ megohm x cm. | | |
| --- | --- | --- | --- |
| Mixture 1 | 20° C. | 50° C. | 70° C. |
| Obtained according to the process of patent 1,103,335 (see table column 8) di-(2-ethyl-hexyl)-phthalate with conventional catalyst | 15,200 | 165 | 35 |
| Prepared with titanium peroxide-containing catalyst according to the present invention | 34,700 | 324 | 85 |
| Mixture 2 | 20° C. | 50° C. | 70° C. |
| Obtained according to the process of patent 1,103,335 (see table column 8) di-(ethyl-hexyl)-phthalate with conventional catalyst | 75,000 | 695 | 70 |
| Prepared with titanium peroxide-containing catalyst according to the present invention | 425,000 | 2,720 | 256 |

I claim:
1. In an esterification process which comprises the reaction of a member selected from the group consisting of a carboxylic acid, carboxylic acid anhydrides and carboxylic acid esters with an alcohol in the presence of an esterification catalyst, the improvement which comprises employing titanium peroxide as the catalyst.

2. A process as set forth in claim 1, wherein the reaction is carried out in liquid phase.

3. A process which comprises forming a plasticizing ester by reacting a carboxylic acid and polyhydric organic alcohol in the presence of a titanium peroxide-containing catalyst.

4. A process for preparing a carboxylic acid ester having a low acid number which comprises reacting (1) an organic compound selected from a group consisting of carboxylic acids, carboxylic acid anhydrides and esters of carboxylic acids and anhydrides, with (2) a compound that contains at least one alcoholic hydroxyl group, in the liquid phase, at raised temperature in the presence of titanium compounds, with immediate removal of water from the reaction mixture, which is characterized in that the reaction is carried out at a temperature of from about 140° C. to 250° C. in the presence of a titanium peroxide-containing catalyst in the proportion of about 0.01 to about 10% by weight based upon compound (1).

5. The process according to claim 4 which is characterized in that the catalyst is used in a quantity of about 0.01 to 1% by weight based upon compound (1).

6. A process according to claim 4 which is characterized in that compound (1) is a member of a group consisting of carboxylic acids and carboxylic acid anhydrides.

7. A process according to claim 4 which is characterized in that at least one member of a group consisting of polycarboxylic acids and polycarboxylic acid esters is reacted with an alcohol with formation of a polyester.

References Cited

UNITED STATES PATENTS

| 1,103,335 | 3/1961 | Werber | 260—75 |
| 3,056,817 | 10/1962 | Werber et al. | 260—404.8 |

OTHER REFERENCES

Mellor, Comprehensive Treatise on Inorganic and Theoretical Chemistry, Vol. 7 (1927) p. 63.

JAMES A. PATTEN, Primary Examiner

E. J. SKELLY, Assistant Examiner

U.S. Cl. X.R.

117—232; 252—65, 461; 260—30, 31, 348, 410, 465, 468, 471, 472, 473, 475, 476, 482, 484, 485, 486, 487, 488, 491